(12) United States Patent
Chen et al.

(10) Patent No.: US 7,478,336 B2
(45) Date of Patent: Jan. 13, 2009

(54) INTERMEDIATE VIEWER FOR TRANSFERRING INFORMATION ELEMENTS VIA A TRANSFER BUFFER TO A PLURALITY OF SETS OF DESTINATIONS

(75) Inventors: Yen-Fu Chen, Austin, TX (US); John W. Dunsmoir, Round Rock, TX (US); John H. Bosma, Cedar Park, TX (US); Keith R. Walker, Austin, TX (US); Mei Ying Selvage, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/703,012

(22) Filed: Nov. 6, 2003

(65) Prior Publication Data

US 2005/0102629 A1 May 12, 2005

(51) Int. Cl.
*G06F 3/048* (2006.01)
(52) U.S. Cl. .................. 715/770; 715/769; 715/724
(58) Field of Classification Search ................ 715/770, 715/724
See application file for complete search history.

(56) References Cited

U.S. PATENT DOCUMENTS

| 5,544,300 | A | 8/1996 | Skarbo et al. ............ 345/759 |
| 5,801,693 | A | 9/1998 | Bailey ..................... 345/769 |
| 5,897,650 | A | 4/1999 | Nakajima et al. .......... 715/539 |
| 5,964,834 | A | 10/1999 | Crutcher .................. 709/213 |
| 6,108,668 | A * | 8/2000 | Bates et al. ............... 707/203 |
| 6,177,939 | B1 | 1/2001 | Blish et al. ............... 345/770 |
| 7,171,468 | B2 * | 1/2007 | Yeung et al. .............. 709/225 |

OTHER PUBLICATIONS

TechSmith Corp., SnagIt User's Guide (c) 2002.*
Courter, et al. Mastering Microsoft Office 2000 Professional Edition, (c) 1999, SYBEX, pp. 35, 37.*
John Kaufeld, Access 97 For Windows For Dummies, Copyright (c) 1996, IDG Books Worldwide, Inc. pp. 24, 68, 77, 82, 89, 299, 300.*
Clipboard Magic, v4.1 by Cyber-Matrix, http://www.filebuzz.com/fileinfo/317/Clipboard_Magic.html, Fig. 1.*
Clipboard Magic, v4.1 by Cyber-Matrix, Jul. 4, 2005, http://www.filebuzz.com/fileinfo/317/Clipboard_Magic.html, Fig. 1.*
IBM Technical Disclosure Bulletin "Multiple Item On-line Clipboard", Jul. 1992, p. 425.
File Buzz, "Clipboard Magic v4.01", retrieved on Apr. 7, 2008 from http://www.filebuzz.com/fileinfo/317/Clipboard_Magic.html, 2 pages (please note copyright date at bottom of second page).

(Continued)

*Primary Examiner*—Steven P. Sax
*Assistant Examiner*—Andrey Belousov
(74) *Attorney, Agent, or Firm*—Robert H. Frantz; David A. Mims, Jr.

(57) ABSTRACT

An Intermediate Viewer having a user interface which allows viewing, manipulation, and transfer of information elements contained in a transfer buffer to be transferred to a plurality of destination points or areas, with the destination points or areas being defined as belonging to one or more sets of destination points or areas.

5 Claims, 12 Drawing Sheets

OTHER PUBLICATIONS

Cybermatrix, "Clipboard Magic [TM]: Free Multiple Storage Clipboard Utility", Version 4.01, retrieved on Apr. 7, 2008 from http://www.cybermatrix.com/clipboard_magic.html, 3 pages (please note "version history" link in Product Quick Links box, upper right portion of first page).

Cybermatrix, "Clipboard Magic Version History", retrieve on Apr. 7, 2008 from http://www.cybermatrix.com/changes/cmagic.html, 6 pages (please note v4.01 release date of Nov. 22, 2005 at top of first page).

* cited by examiner

| Name | Age | Miles Driven |
|------|-----|--------------|
| Bob  | 23  | 1023 |
| Jane | 44  | 925 |
| Hal  | 58  | 2041 |

"Our three drivers celebrate the conclusion of their trip to see all of the sites where Elvis Presley ate peanut butter sandwiches in public."

| Name | Age | Miles Driven |
|------|-----|--------------|
| Bob  | 23  | 1023 |
| Jane | 44  | 925 |
| Hal  | 58  | 2041 |

"Our three drivers celebrate the conclusion of their trip to see all of the sites where Elvis Presley ate peanut butter sandwiches in public."

INTERMEDIATE VIEWER FOR TRANSFERRING INFORMATION ELEMENTS VIA A TRANSFER BUFFER TO A PLURALITY OF SETS OF DESTINATIONS

CROSS-REFERENCE TO RELATED APPLICATIONS

Claiming Benefit Under 35 U.S.C. 120

This application is related to U.S. Pat. No. 7,310,781, filed on Jun. 5, 2003, by Yen-Fu Chen.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related, U.S. Pat. No. 7,310,781, filed on Jun. 5, 2003, by Yen-Fu Chen, is incorporated by reference, in entirety, including figures, to the present patent application.

BACKGROUND OF THE INVENTION

1. Field of the Invention

This invention relates to the arts of computer user interfaces and data exchange between program entities such as instances of programs in a multi-tasking computer system, and especially to computer methods for transferring information from multiple sources into a single user interface which allows the content to be managed, edited, and manipulated before delivering it to one or more destinations.

2. Background of the Invention

Modern multi-tasking computers provide a variety of user interfaces for controlling multiple application programs and system functions which operate simultaneously. Some of the most widely used multi-tasking computer systems are personal computers ("PC") running a multi-tasking operating system ("OS") such as International Business Machines' ("IBM") OS/2™ or AIX™, Microsoft Windows™, and Apple Computer's MacOS™. Other operating systems may be used with personal computers as well as larger computers such as enterprise-class computers, such as UNIX, Sun Microsystems' Solaris™, Hewlett Packard's HP-UX™, and the "open sourced" LINUX. Smaller computing platforms such as held-held computers, personal digital assistants ("PDA"), and advanced wireless telephones may run operating systems targeted for such hardware including Palm Computing's PalmOS™ and Microsoft's Windows CE™. Additionally, there are many "proprietary" and less widely-used computing platforms and operating systems which also allow users to control and run multiple programs and system functions simultaneously.

Many of these systems will use tabs, icons, windows, frames, pages and special key combinations to allow a user to switch between user interfaces ("UI") for each program and system function which is being executed, or to start or stop the execution of a program or system function. For example, in a personal computer running MS Windows™, the user may first start a web browser program running using several methods (e.g. double clicking an icon on the desktop, selecting the program from a Start Programs list, operating a "hot key", etc.), and then may start a document editor program using similar methods. Each program establishes a user interface such as its own "window". The user can then control a program by selecting its window using one of several available methods, such as selecting a button or icon on a command bar, activating a "task list" and selecting a program, etc. As a result, a user can start and run many programs simultaneously, periodically switching between their user interfaces to accomplish work or entertainment tasks as needed. Other computing systems provide similar basic user control capabilities, albeit with a variety of user controls to switch between programs and system functions.

Users often wish to copy or transfer information or "content" from one program or system function to another. For example, a user may be preparing an invoice for a client using a word processor program, but may also be simultaneously using a database or spreadsheet program to perform various calculations. Using "copy and paste" functions of the application programs and the operating system, the user may select information from a source program (e.g. the spreadsheet), and "paste" it into the destination program (e.g. the invoice being edited). Such a process is so common place in computer users' daily lives that it is rote, albeit each user may know several sequences of actions for several computers which he or she commonly uses (e.g. one process on his home PC, another on his PDA, and another on his networked terminal at work). These memorized methods may typically include several steps of clicking on icons, dropping down lists, highlighting information, and using navigation controls within program UI's.

For example, turning to FIG. 1, a "windows" style user interface is depicted to illustrate a process of "copying" information from a web browser program to a word processor file via a "clipboard" memory. In this system, each program provides a window (2, 3, 104) which can be closed (9, 9') to end the program, maximized (8, 8') to view the full UI for that program, or minimized (7, 7') to leave the program running but deactivate the UI (e.g. clear the UI window from the screen). In this example, these controls are located in a command bar (4, 4') along the top of the UI window, but many other variations are known in the art.

Each UI window also typically has navigation controls such as left panning (15, 15'), right panning (13, 13'), and horizontal scroll (14, 14') controls, as well as up panning (10, 10'), down panning (12, 12'), and vertical scroll (11, 11'), for viewing areas of information and content not completely viewable in the UI. Information, icons, text, graphics, etc., are shown or displayed within (16, 18) the UI window according to the scroll and panning control settings. More recently, the term "content" (16, 18) has been used to collectively refer to all types of information which may be displayed or presented in a user interface, including but not limited to text, graphics, still images, animated images, video, audio, and hyperlinks.

Now suppose for the purpose of our example, the user has started a word processing program which provides a first UI window (2), and a web browser which provides a second UI window (3). Also suppose that the user is researching information on the Internet using the web browser while authoring a paper which is being edited simultaneously using the word processor.

In this example, the user has found information (19) at a hypothetical web address (17) that he wants to "quote" in his or her paper. So, the user must first move the cursor (104) in the word processor to select an insertion point for the information, then must switch to the web browser UI, select the text (19) in the source content, operate a "copy" command in the web browser UI which copies (101) the content into a buffer (100) such as a "clipboard", switch back to the word processor UI, and operate a "paste" or "insert" command, which results in the copied content (19) being inserted into the destination document at the point of insertion (103). The user can repeat this process for many different program UI's (106).

In some software and hardware configurations, the copy buffer may be provided within a suite of application programs which are "tightly coupled" or related. Such suites cooperate with each other in ways not possible with software programs provided by differing suppliers. In many cases, however, the operating system provides a buffer function which is generally accessible by all programs, such as the clipboard in the MS Windows™ operating system.

Also, in some situations, the original content with its original format may not be acceptable by the destination program, and as such, a specialized paste or insertion function (105) may be provided by the destination program or operating system which converts the content to a form useful by the destination program. For example, text copied from a web page may include color, size, font, style, and hyperlink reference information embedded in the base Hyper Text Markup Language ("HTML") of the source web page. However, not all word processors are able to interpret all of these special codes and identifiers, so a "paste as plain text" option may be provided by a converter or translator (105) function.

So, to illustrate the complexity and tedious nature of such ordinary operations, we present the steps in full to accomplish this example scenario of simply transferring a block of formatted text from a web page to a word processor program, starting from a point where the user is editing the destination document in the word processor:

(a) navigate to the insertion point in the destination document using the word processor UI window controls (e.g. multiple clicks on scroll, panning or page up/page down keys);
 (b) optionally select text or content in the destination document which is to be replaced;
 (c) switch to the web browser UI window (e.g. click on an icon in a task bar, activate a task list and pick a running web browser program, etc.);
 (d) navigate in the web browser UI window to find the text or content desired to be transferred into the document (e.g. use panning, scrolling, or page up/page down keys);
 (e) select the source content or text (e.g. click-and-drag over the content to highlight it)
 (f) transfer the content to a copy buffer (e.g. click on "Edit" command, select "copy" option or type Alt-E, Alt-C);
 (g) switch back to the word processor UI window (e.g. (e.g. click on a icon in a task bar, activate a task list and pick a running web browser program, etc.); and
 (h) operate a "paste" command in the word processor UI window (e.g. click on "Edit" command, select "paste" option or type Alt-E, Alt-P).

Each of these operations may actually require several steps (clicking, scrolling, selecting, typing, etc.), so this minimal process may represent 7 to 25 actual user actions. This process must be repeated for each block of text or content to be transferred from multiple program UI windows (106), and additional steps may be necessary to achieve a "special paste", as described above. Also, if the same text or content is to be inserted into the destination document for file at multiple locations, the last few operations of this process (h) in addition to some navigation actions must by performed by the user.

As a result, consolidating information from multiple sources of information may be extremely tedious, frustrating, and tiresome using the currently available methods and apparatuses provided in such computing systems. Some systems may provide notably more "user friendly" or intuitive methods, while other systems are much more difficult and "clunky" to use.

Turning to FIG. 2, this process is generalized. Starting at a point or time (21) when the user is actively working with the destination program UI, the user must navigate (22) within the present document, file, or other computer resource to a point where the content insertion is to be made, including selecting any content which is to be replaced. Then, the user must switch (23) to the UI of the first source of information, navigate (24) to the first source content to be transferred, select that content, and operate (25) a copy or cut control in the first source UI.

Next, the user must switch (26) back to the destination UI, and operate (27) an insert or paste command in that UI. If (28) the user wants to insert or paste that content into multiple destinations, the user must navigate (29) to each destination and operate (27) the paste or insert command in the destination program UI, until all insertions have been made for that source information.

If (200) the user desires to transfer information from other points in the same source, or from other sources, the user must repeatedly switch (201) to a source UI, navigate (202) to a source content point, select source information, operate (25) a copy or cut operation, switch (26) back to the destination UI, and paste or insert (27) the content, until all information has been transferred (203).

Implied, but not shown in detail, in this generalization of the process can be multiple user actions for each general step. Optionally, options such as conversion of the content may be necessary, which requires additional user actions (e.g. the "paste as plain text" example).

So, it is not inconceivable that in the course of authoring a paper using a word processor and information from several sources, the user may have to perform hundreds of tedious actions, commands, selections, navigation operations, etc.

In this paradigm, certain conventions have evolved into place which only moderately simplify or reduce the burden of such operations. For example, performing a "cut" operation usually deletes the selected source content from the source file, and places a copy of it into the transfer buffer, sometimes overwriting the current contents of the transfer buffer. A "copy" operation typically leaves the selected information unchanged in the source and only places a copy of the information in the transfer buffer. Additionally, in the destination UI, a "paste" or "insert" command may copy the contents of transfer buffer to a selected point in the destination document or file, leaving a copy in the transfer buffer for additional pastes or insertions.

In some programs, a "paste special", "import from clipboard", or similar command may be available with several conversion options to perform a minimal conversion process on each transfer. However, even though the user may be performing the same "paste special" command over and over, the typical UI does not memorize or "learn" this process, so the user is forced to respond to a number of redundant options and dialogs on each paste operation.

The same user interface conventions are followed by many computer systems not only for content or information within a computer resource such as text and graphics within a file, but also for resources (e.g. files, shortcuts, icons, mappings, etc.) within a computing environment (e.g. file system, directories, folders, etc.). For example, when working with a MS Windows™ operating system and running the Windows Explorer program, a user may select a file, directory or folder to move, execute an "Edit-Cut" command sequence, navigate to another directory or drive, and execute an "Edit-Paste" command to move the selected resource to the new destination. Similarly, by selecting the source resource, executing a copy command, and then executing a paste command to one or more destinations, the original resource is not changed but copies of it are deposited at the destination points. Further, by selecting and copying a source resource, then selecting a destination resource, replacement of the destination resource may be accomplished.

There are a number of "clipboard viewers" available on the market today. For example, Microsoft Windows™ operating system includes a clipboard viewer system tool which allows a user to see the current contents of the Windows transfer buffer. There is little or no ability provided by the clipboard viewer, though, to manipulate or rearrange the contents, but there is provided limited capability to save the contents into a new file. For example, if a user first goes to the GUI for a first program, and selects a graphic image and a block of text, and then executes a "copy" command, the graphic image and the block of text are copied into the clipboard. So, if the user now goes to the GUI for the clipboard viewer, he or she will see the graphic image and the text. However, he or she may not edit the text, or save only the image, etc., as all operations must be performed on the entirety of the contents of the clipboard (e.g. save everything to a new file, paste everything to a destination GUI, etc.).

Other, more advanced clipboard viewer programs, typically "freeware" and "shareware programs, allow some manipulation of the contents of the clipboard, but allow "pasting" of the information only to one destination document, file, folder or GUI.

There are many situations, however, where that it is desirable to collect up information into a transfer buffer from multiple sources without replacing or overwriting the contents of the buffer (e.g. concatenate or merge select information elements), and subsequently there is a need to deliver subsets of that collected information to multiple destination programs, folders, documents or GUIs. For example, consider a situation where a programmer is editing the source code for a new software program, and simultaneously creating in another GUI (presumably with another program) a comments or release notes file. As he or she cuts-and-pastes information from several sources (e.g. from a web browser with online example code, a white paper with a high level functional description, etc.), some of the information may need to be transferred to both the source code and the comments document, some of the information may only need to be transferred to the comments documents, and other information may only need to be transferred to the source code under development. As shown in FIG. 1, current "paste" operations and clipboard viewers only allow designation of a single destination, requiring the user to perform multiple copy and paste operations to achieve the desired results in this situation.

Therefore, there is a need in the art for a system and method which allows a user to view, manage, manipulate, and transfer selected information elements from multiple sources to multiple destinations in a more efficient and centralized manner.

SUMMARY OF THE INVENTION

The present invention provides a method during editing by a user contents of at least one computer resource in at least one graphical user interface, allowing the user to designate a plurality of sets of copy command destinations points within the displayed contents within the graphical user interface, wherein each destination point is allowed to be included in more than one set of destination points, said computer resource comprising one or more computer files being edited by said user, and said destination points comprising positions within said computer resource contents; providing an Intermediate Viewer that displays one or more information elements contained in an operating system clipboard transfer buffer, receives a selection by the user of one or more displayed information elements in said clipboard transfer buffer, and allows the user to define a subset of said previously-designated copy command destination points: and which automatically transfers from the clipboard transfer buffer a plurality of copies of the selected information elements to points within the contents of the computer resource corresponding to each of the copy command destination points in the subset of destination points.

BRIEF DESCRIPTION OF THE DRAWINGS

The following detailed description when taken in conjunction with the figures presented herein provide a complete disclosure of the invention.

DETAILED DESCRIPTION OF THE INVENTION

Figure 1:
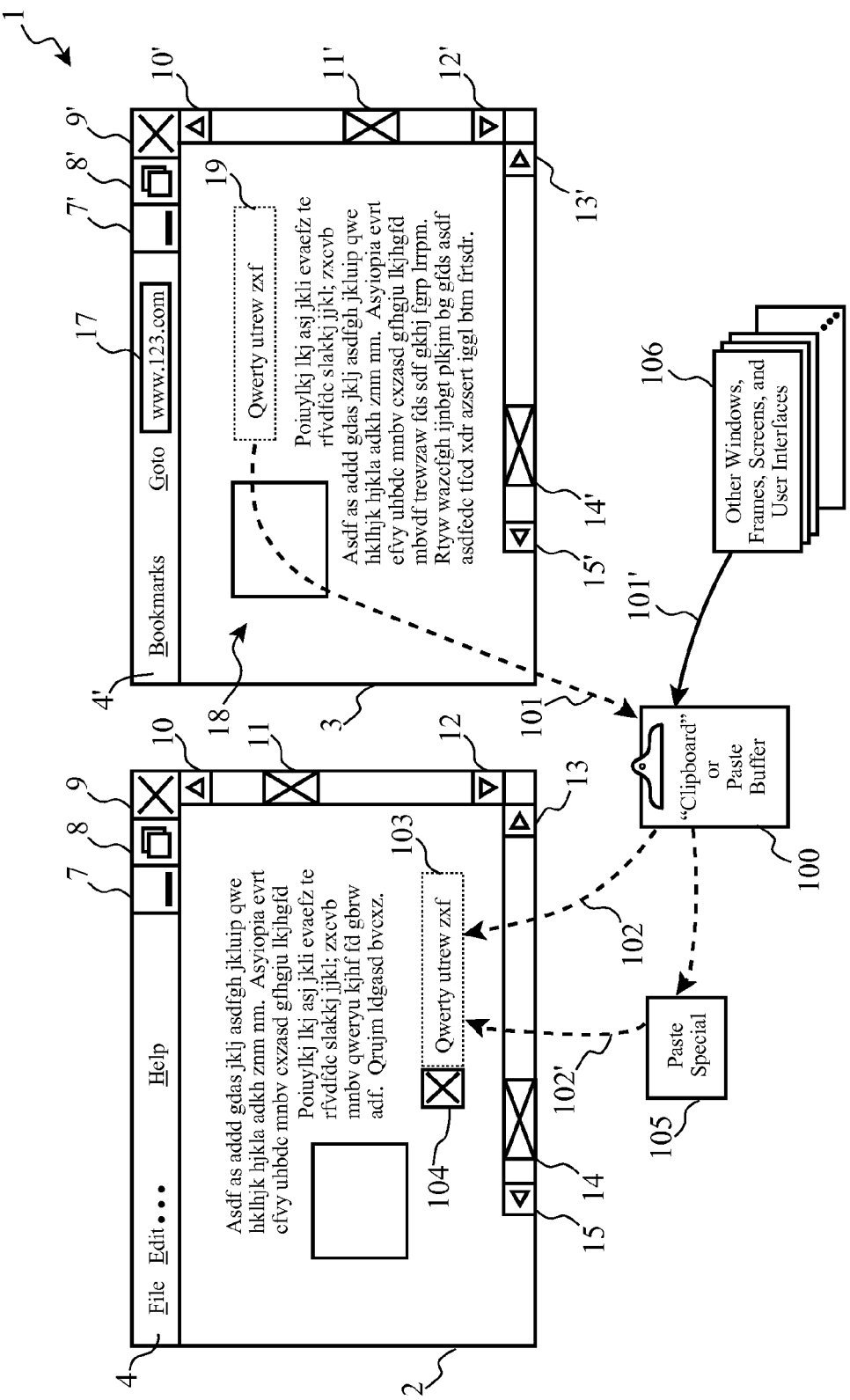
FIG. 1 illustrates the typical user interfaces and system actions of "cutting and pasting" information from one application program to another.
Figure 2:
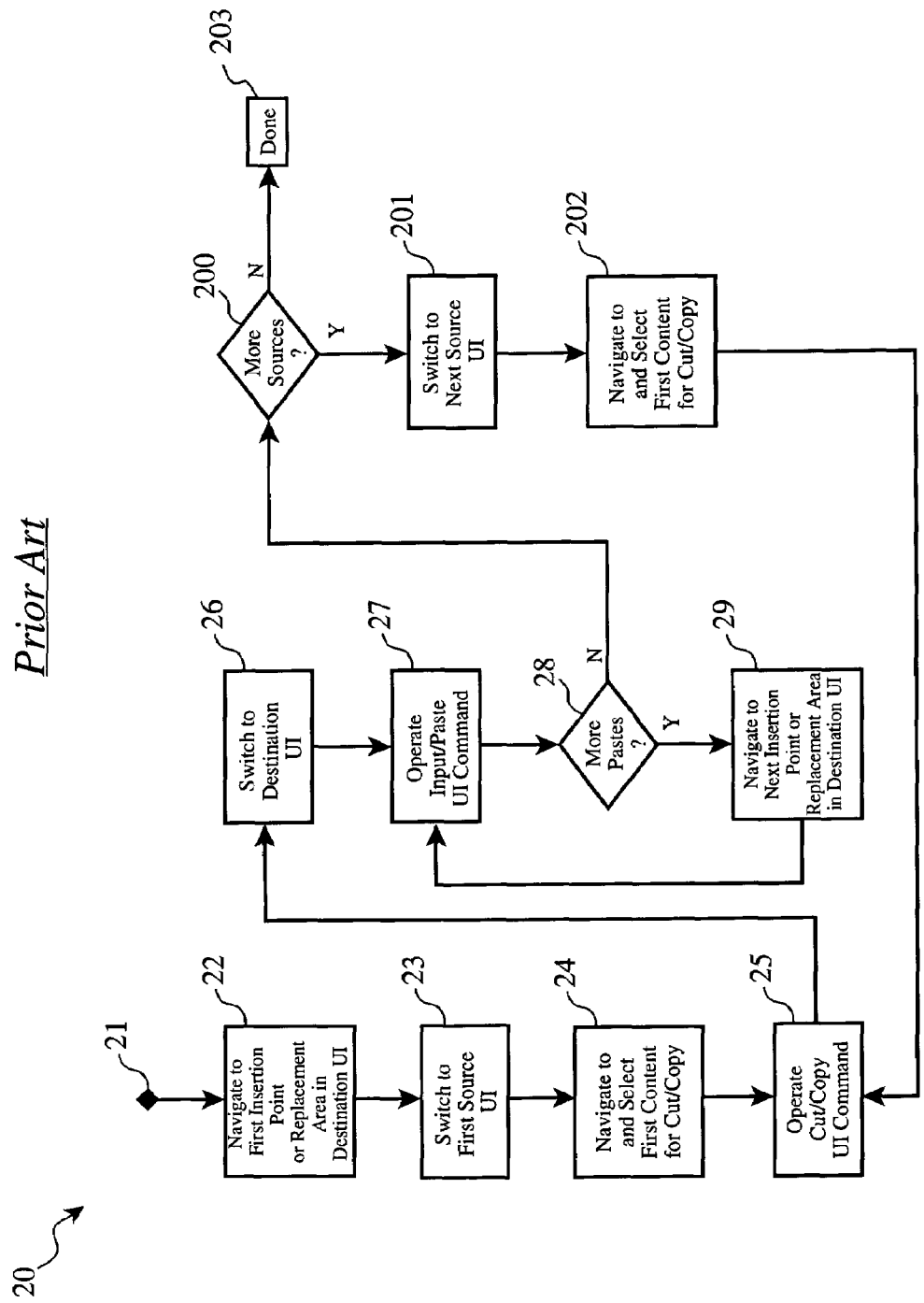
FIG. 2 shows the typical logical process in a general manner for transferring content from one application program or system function to another.

The present invention provides an Intermediate Viewer ("IV") for a transfer buffer allows a user to see, hear, and/or watch the contents of a transfer buffer which contains information elements (e.g. text, paragraphs, images, sound clips, etc.) taken from multiple sources. The user may manipulate, edit, and rearrange the information elements prior to delivering it to one or more destinations. Additionally, the IV allows the user to designate sets of destinations, and then to select information elements currently held in the transfer buffer for delivery to a particular set or several sets of destinations. For example, if a user copies five information elements into a transfer buffer from one or more sources, he or she may use the IV to view/see/hear/watch those five information elements, rearrange them, copy them, etc. The user may also designate, for examole 3 destinations for information, such as a web page being edited, a document being edited with a word processor, and a graphics editing program. He can group these destinations such as:

Group A Destinations =web page and document and graphics editor;

Group B Destinations =web page and document only

Grouo C Destinations =document and graphics editor only

Then, using the IV to select one or more of the five information elements, the user may selectively transfer the selected information elements to a set of destinations. For example, he may select two graphic images currently held in the transfer buffer, and transfer them to Group C so that they are inserted into the document being edited and the graphics editor image, but not into the web page being edited.

The present invention is preferably realized as an enhancement of the related inventions, but may be alternately realized in some embodiments as a stand alone tool or as an improvement to other products and application program. As such, the present invention will be described in detail relative to the details of the related inventions. Many details of the related inventions are repeated herein for better understanding of the present invention, but this should not be construed as a limitation of the various available embodiments of the present invention. It is within the skill of those in the art to adapt the present invention to other embodiments, when provided with the description contained herein.

The first related invention described in the related patent application entitled "System and Method for Content and Information Transfer Between Program Entities", filed by Yen-Fu Chen, et al., and incorporated herein, addresses the aforementioned limitations of information transfer between program entities to a large degree. The related invention enables users to preselect or pre-designate one or more destination content area(s) or points, and then to only perform the highlighting action in the source files or documents to produce copy/paste results without any additional mouse clicks or touching the keyboard.

According to one aspect of the first related invention, the user initially designates one or more insertion points or replacement areas for receiving transferred content in a destination UI, then switches to a source UI, highlights content to be transferred, and the system performs the copy or paste operation without any additional user action, including any conversion as may be necessary.

Then, the user may simply navigate to another point in the same source, or switch to another source UI, select content, and it will be "pasted" automatically into the destination without the user having to switch back to the destination UI or perform any additional paste or insert command actions.

Figure 5:
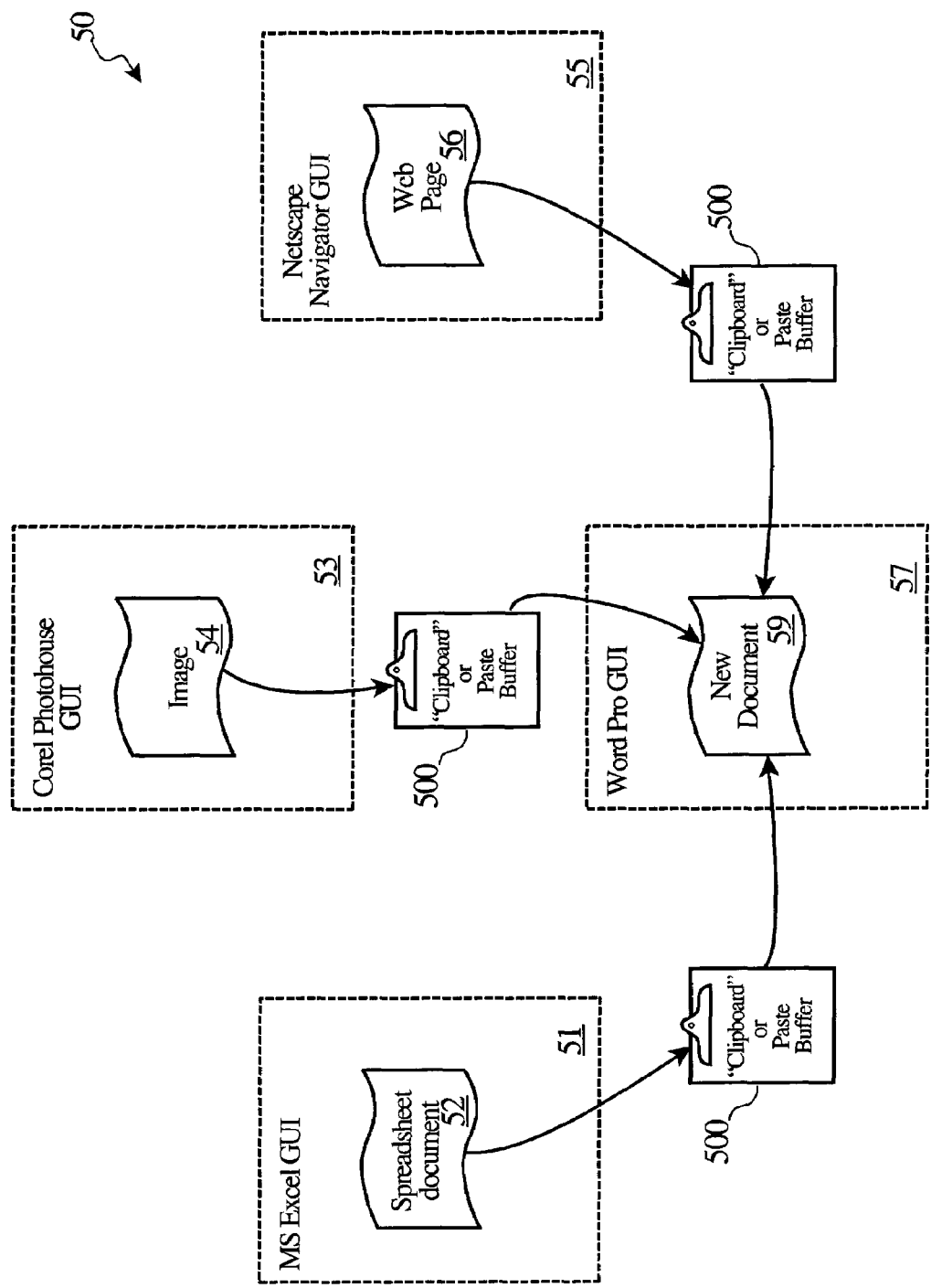
FIG. 5 illustrates a process of consolidating information from 3 sources into a new document.

However, this arrangement depends on a designated destination application or document to be the point of consolidation of information from the source applications and documents. For example, if a user is creating a new document (59) using the Lotus WordPro word processor program, and there is a need to consolidate information from a Microsoft Excel™ spreadsheet (52), and image (53) from Corel Photohouse™ image editor, and a portion of a web page (56) with an associated graphic image being viewed with Netscape Navigator web browser program, as shown in FIG. 5.

In this figure, each arrow leading from a source document to the clipboard or paste buffer (500) represents an user action to switch to the appropriate application user interface (51, 52, 55) such as an Alt-Tab key combination in MS Windows, highlighting the desired content to be copied to the new document such as by clicking-and-dragging with a mouse, and executing a copy or cut operation such as by selecting Edit and Copy from a drop down list in the source application GUI (51, 53, 55). Each of these groups of operations, then, potentially involves 4 or more user actions.

Each "pasting" operation is represented by an arrow leading from the clipboard or paste buffer (500) into the new document (59). A paste operation includes switching back to the destination application user interface (57) such as by Alt-Tab key combination, then selecting a point for insertion in the new document (59) such as by clicking in the document with a mouse, and then executing a paste operation such as by selecting Edit and Paste from a drop down list in the destination application GUI (57). Each of these paste operation represents 4 or more user actions.

To further complicate matters, each application GUI may use slightly different actions to perform a cut, copy or paste. As such, just to consolidate information from three sources into one destination, 24 or more user actions may be required.

Using the first related invention, this effort can be significantly reduced by allowing the user to first designate a single insertion point in the destination document, and then to visit each source and select information to be automatically transferred to the destination without returning to the GUI for the destination until all the sources have been designated.

This, though, effectively concatenates all of the selected information into one long series of information elements in the source document. Consider the following example, wherein a user first transfers the table of numbers:

| Name | Age | Miles Driven |
|------|-----|--------------|
| Bob  | 23  | 1023         |
| Jane | 44  | 925          |
| Hal  | 58  | 2041         | from the spreadsheet to the new document. Next, the user transfers an image, which we will refer to as <Map_Image>, from Corel Photohouse to the new document. Finally, the user transfers the following text and image from a web page:

"Our three drivers celebrate the conclusion of their trip to see all of the sites where Elvis Presley ate peanut butter sandwiches in public."<Group_Photo> to the new document. In such a case, the user would then return to the GUI for editing the new document, where the following content would appear:

| Name | Age | Miles Driven |
|------|-----|--------------|
| Bob  | 23  | 1023         |
| Jane | 44  | 925          |
| Hal  | 58  | 2041         |

<Map_Image>

"Our three drivers celebrate the conclusion of their trip to see all of the sites where Elvis Presley ate peanut butter sandwiches in public."<Group_Photo>

The information elements (e.g. the table, images, and paragraph) are now individually editable, and may be moved, edited, changed, deleted, etc., at will.

In many instances, though, it is desirable to maintain the relationship between the information elements for convenience of manipulation, and for source tracking. For example, the <Group_Photo> is associated originally with the web page and the paragraph "Our three drivers . . . ". As such, it may be desirable to manipulate them together (e.g. moves, deletes, updates, etc.) in the new document. Additionally, the threes lines of the table are logically associated with each other, and it may be desirable to keep them together while editing the new document.

Unfortunately, though, when the content is "pasted" using the convention means provided by most operating systems and application suites the information elements are not maintained in a logical association with each other.

Therefore, there was a need in the art for a user interface and tool which provides a way for a user to see the contents of a transfer buffer (e.g. clipboard) taken from multiple information sources, manage and change the buffer contents in a manner which maintains logical association of information elements with respect to their sources, and then to deliver that managed and manipulated information to a destination of the user's choice.

The Meta Window described in the second related invention, entitled "Meta Window for Merging and Consolidating Multiple Sources of Information", for which the patent application has been incorporated herein, provides a convenient place (e.g. a single user interface) where all information elements copied from multiple sources can be better organized, either as information elements consolidated into the Meta Window, or as a set of sub-windows organized inside the Meta Window. As such, the second related invention's advantages apply not only to auto-paste operations, but extend to advanced operations for combining and managing information such as text, images, video, audio, etc.

According to one aspect of the second related invention, the user initially designates one or more insertion points or replacement areas for receiving transferred content in a destination user interface ("UI"), then switches to a first source UI. The user then designates the first source as a Meta Window source, such as by selecting a menu option or icon. The user then navigates to a second source UI, designating it also as a source, and subsequently to additional source UI's, if needed. The Meta Window is automatically invoked following designation of the second source UI, and the entire contents of each source document or file are copied into the Meta Window.

After designating all of the source documents and files, the user may navigate to the Meta Window, conveniently perform manipulation of the content such as rearrangement of the content, and finally transfer the final content to the designated destination. This allows the user to deal with the multiple source information elements while within a single user interface environment, e.g. the Meta Window environment, which is more convenient and efficient than navigating among multiple source UI's as previously allowed by the related invention.

The Meta Window maintains logical association between information elements with respect to their sources, such as all elements from a first word processor are logically grouped and manipulated together, all elements from an image editor are logically grouped and manipulated together, and so forth. This logical association can be conveyed to the user in a manner which is intuitive to understand, such as a paragraph of text and an image from a single source may be shown with a green dotted line encompassing them together, and a table of text having several lines of information taken from another single source may have a red dotted line encompassing the entire table. Optionally, the source may be identified with each group of logically associated elements using fly over text or a small marker or tag element, or may be indicated as a group by placing them in graphical elements which appear to be sub-windows within the Meta Window.

When the user has completed reviewing and manipulating the contents of the transfer buffer, the consolidated or merged information can be delivered to a selected destination such as a web page file, word processor file, etc.

According to one aspect of the second related invention, the user can simply consolidate sources into the Meta Window by dragging icons which represent each source file or element onto an icon representing the Meta Window.

According to another aspect of the second related invention, the user may elect to have links, such as Object Linking Environment ("OLE") links created for each information element to its source, and a user option may be activated to automatically "refresh" or update the consolidated information by retrieving newer information elements from the same source, if available.

According to yet another aspect of the second related invention, the Meta Window maintains a list of manipulation actions performed by the user, and allows the user to "undo" or reverse any or all of the manipulation actions previously performed.

According to an optional embodiment of the second related invention, each group of logically associated information elements may be indicated as a group by placing them in graphical elements which appear to be sub-windows within the Meta Window.

The present invention is preferably realized as an enhancement or extension to these two related inventions, using some of the functionality of both while providing additional functionality to allow a user to designate and manage multiple destinations for selected information elements. However, alternate embodiments of the present invention include realizations which do not incorporate or depend upon the related inventions. For better clarity and better understanding, we will refer throughout this document to the present invention as an "Intermediate Viewer" ("IV"), and we will first present details of the related inventions for completeness of disclosure.

Suitable Computing Platforms

The present invention is preferably realized as computer-executable code such as compiled software, scripts, or portable programs, in conjunction with existing application programs, operating systems, and computer hardware. For purposes of completeness, we first present a generalized view in FIGS. 3 and 4 of typical computer hardware and software which is suitable for realization of our invention. Many variations of these computer platform details may be made without departing from the scope of the invention, as will be readily recognized by those skilled in the art.

Common computing platforms such as personal computers, web servers, and web browsers, as well as proprietary computing platforms, may be used in realization of the present invention. These common computing platforms can include, but are not limited to, personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 3:
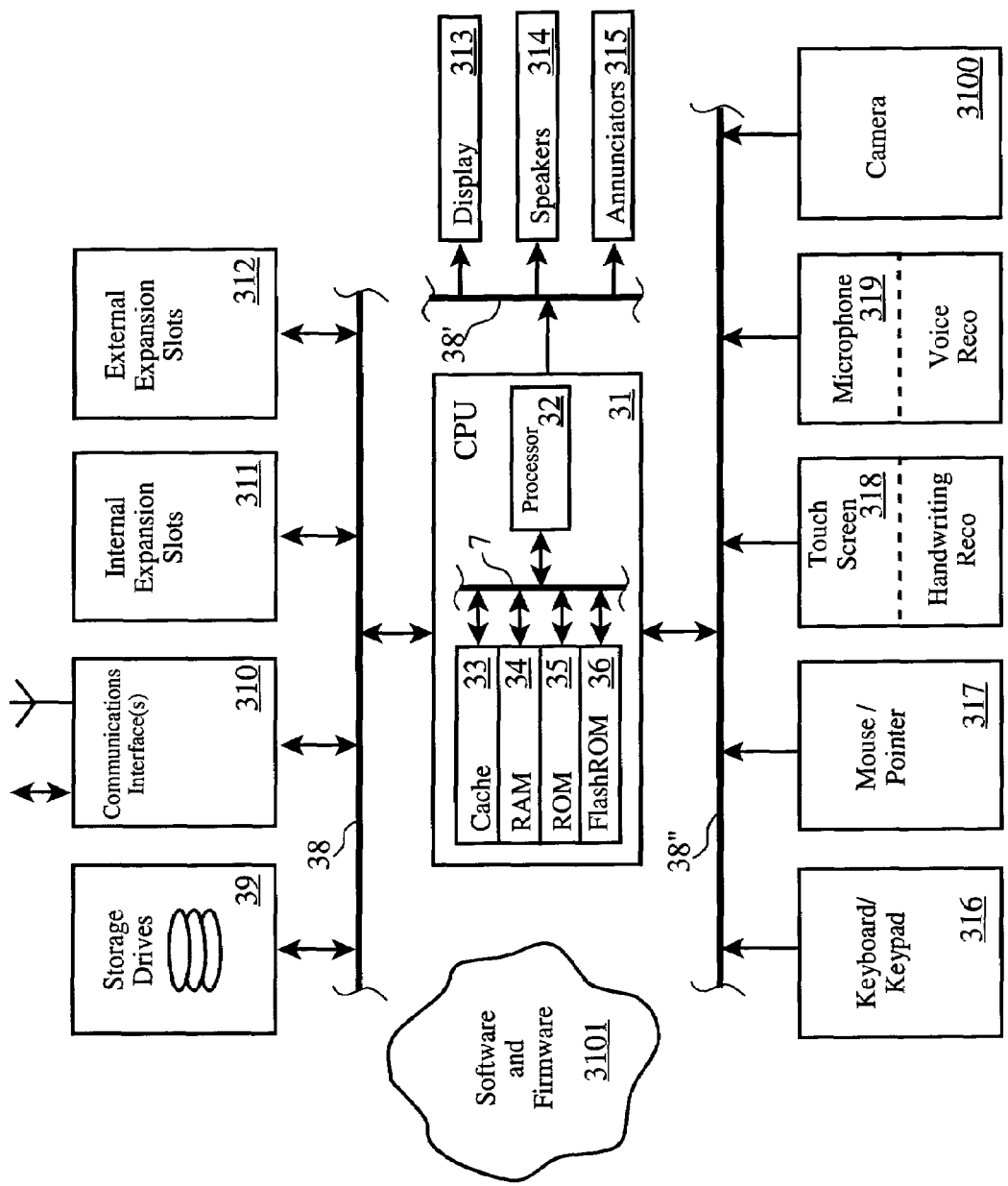
FIG. 3 depicts a generalized computing platform architecture, such as a personal computer, server computer, personal digital assistant, web-enabled wireless telephone, or other processor-based device.

Turning to FIG. 3, a generalized architecture is presented including a central processing unit (31) ("CPU"), which is typically comprised of a microprocessor (32) associated with random access memory ("RAM") (34) and read-only memory ("ROM") (35). Often, the CPU (31) is also provided with cache memory (33) and programmable FlashROM (36). The interface (37) between the microprocessor (32) and the various types of CPU memory is often referred to as a "local bus", but also may be a more generic or industry standard bus.

Many computing platforms are also provided with one or more storage drives (39), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (310), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (311), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (312) allowing the user the ability to easily install and remove hardware expansion devices, such as PCMCIA cards, SmartMedia cards, and various proprietary modules such as removable hard drives, CD drives, and floppy drives.

Often, the storage drives (39), communication interfaces (310), internal expansion slots (311) and external expansion slots (312) are interconnected with the CPU (31) via a standard or industry open bus architecture (38), such as ISA, EISA, or PCI. In many cases, the bus (38) may be of a proprietary design.

A computing platform is usually provided with one or more user input devices, such as a keyboard or a keypad (316), and mouse or pointer device (317), and/or a touch-screen display (318). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (318) is usually provided, often with handwriting recognition capabilities.

Additionally, a microphone (319), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (3100), such as a still digital camera or full motion video digital camera.

One or more user output devices, such as a display (313), are also provided with most computing platforms. The display (313) may take many forms, including a Cathode Ray Tube ("CRT"), a Thin Flat Transistor ("TFT") array, or a simple set of light emitting diodes ("LED") or liquid crystal display ("LCD") indicators.

One or more speakers (314) and/or annunciators (315) are often associated with computing platforms, too. The speakers (314) may be used to reproduce audio and music, such as the speaker of a wireless telephone or the speakers of a personal computer. Annunciators (315) may take the form of simple beep emitters or buzzers, commonly found on certain devices such as PDAs and PIMs.

These user input and output devices may be directly interconnected (38', 38") to the CPU (31) via a proprietary bus structure and/or interfaces, or they may be interconnected through one or more industry open buses such as ISA, EISA, PCI, etc.

The computing platform is also provided with one or more software and firmware (3101) programs to implement the desired functionality of the computing platforms.

Figure 4:
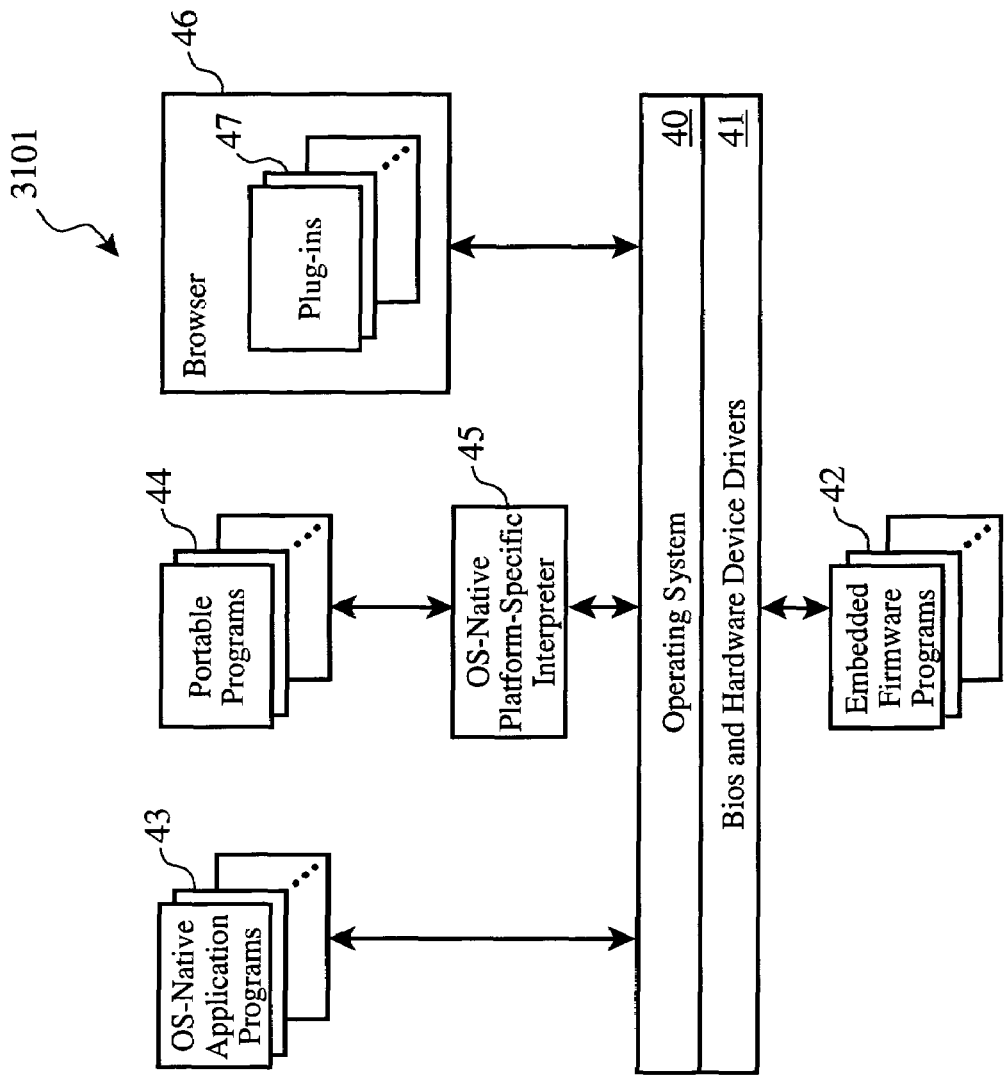
FIG. 4 shows a generalized organization of software and firmware associated with the generalized architecture of FIG. 1.

Turning to now FIG. 4, more detail is given of a generalized organization of software and firmware (3101) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java™ scripts and programs.

Often, computing platforms are also provided with a form of web browser or microbrowser (46), which may also include one or more extensions to the browser such as browser plug-ins (47).

The computing device is often provided with an operating system (40), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units.

General Logical Processes of the Invention

We now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

In general, the first related invention provides the user the ability to follow this process, which is incorporated preferably by the realization of the present invention:

1. Declare destination content area for pasting or insertion in a destination UI;
2. Enable highlighting or selecting content to automatic copy selected information and store it in memory (e.g. buffer/clipboard) for future usage, as well as to automatically insert or paste the selected information into the pre-designated destination area;
3. Switch to source UI's, and simply highlight or select the desired content portion(s) which triggers dynamic insertion/concatenation into the declared content field.
4. Receive an automatic notification that a portion of the highlighted source information is not compatible with the destination; and
5. Define new rule or process for handling the incompatible content such as conversion, isolation and annotation, such that future similar situations are handled automatically according to the user's preferences.

Advantages over presently available methods and user interfaces are:

1. User-friendly: the invention utilizes maneuvering techniques with which users are already familiar, such as double mouse clicks, dragging to highlight, etc.;
2. Convenient: the invention provides a user a new way of selecting destination for paste operations, and offers a quicker way of copy/paste by eliminating keyboard strokes, mouse clicks, navigation and toggling between different program windows and UI's.
3. Intuitive: Users can learn or "discover" that in this new mode, content highlighting triggers copy/paste effortlessly, immediately seeing the results of the highlighting action, and proceeding to experiment with various ways of applying and exploring this invention.
4. Time-Saving: Reduces time to compile information from multiple sources by making copy-paste user interface methods much more efficient.
5. Increases productivity: By reducing fatigue and tediousness in application program user interfaces, users are allowed to produce more accurate results with less effort in less time.

Figure 6:
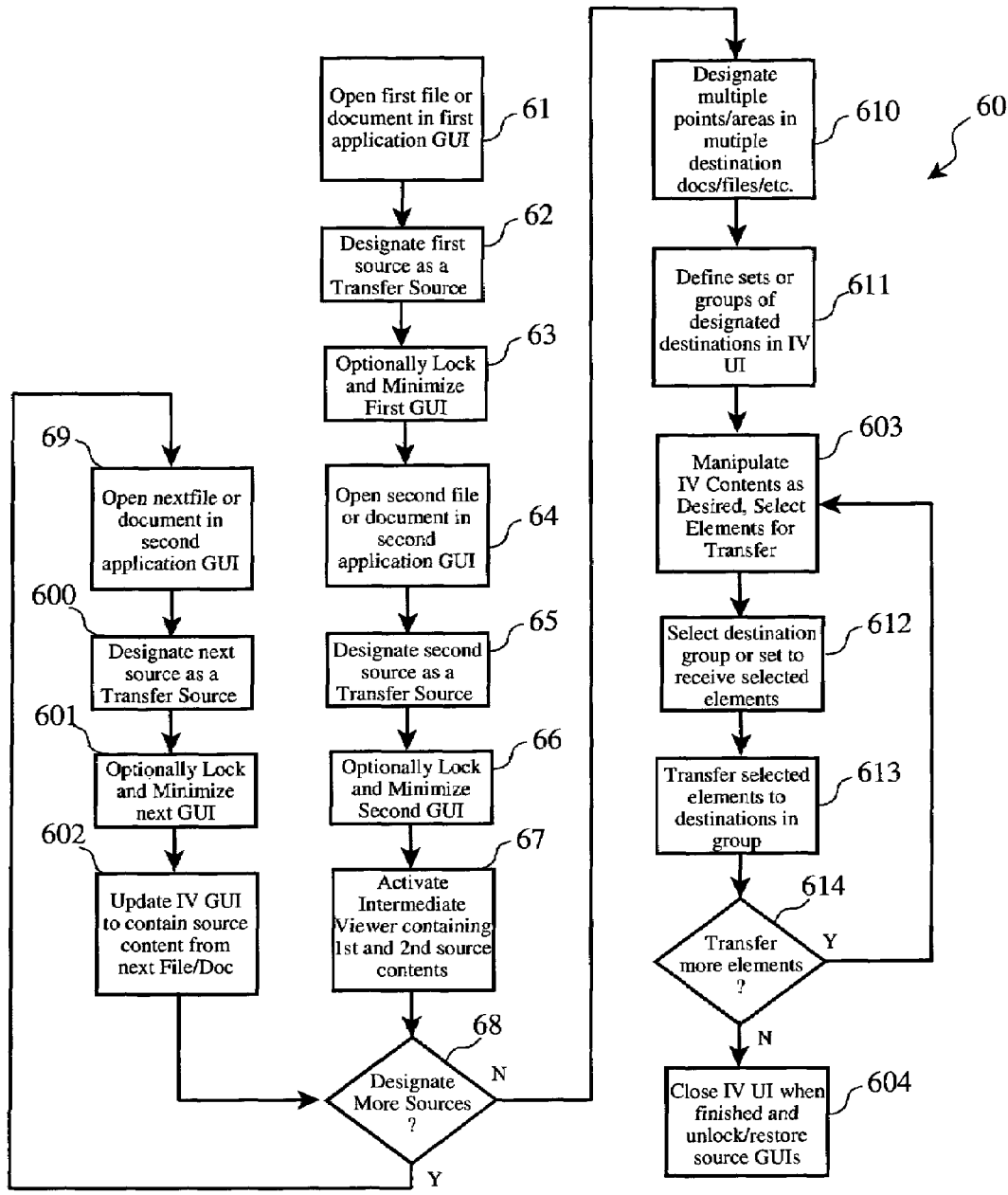
FIG. 6 illustrates a logical process according to the present invention.

Turning to FIG. 6, a first logical process of the present invention is shown at a high level. This method may be implemented as compiled code, scripts, or interpretable code (e.g. Java, applets, servlets, etc.) in full or part within application programs, operating systems, server suites, utility programs, or proprietary code or hardware.

When creating or editing a new computer resource such as a computer file or document and the user wishes to insert or copy content from multiple sources to the resource being edited, the user may execute the method (60) shown.

The user navigates (61) to a first source application user interface ("UI"), and designates (62) it as a source for the transfer buffer, such as by selecting a menu option or clicking on an icon. The user selects one or more source information elements in this UI which are copied into the transfer buffer. The first source application UI is then optionally locked (63) (e.g. user changes and manipulations of content are disallowed), and preferably the UI is minimized, moved to the back of the desktop, or otherwise removed from the screen.

Then, the user navigates (64) to a second source application UI, and designates (65) it as a source for the transfer buffer in a similar manner. Again, the user selects one or more source information elements in this UI which are copied into the transfer buffer. The second source application UI is then locked (66), and preferably the second UI is minimized, moved to the back of the desktop, or otherwise removed from the screen.

Now that at least two sources have been designated, the Intermediate Viewer ("IV") user interface is displayed (67) at the forefront of the screen or desktop, in which the select information elements from the first source and second source are shown as collected in the transfer buffer. Also, preferably, the information elements taken from both sources are maintained in logical association with each other with respect to their source, and this relationship is indicated to the user.

If (68) more sources are to be combined in the IV, the user navigates (69) to each additional source UI, designates (600) the additional source as a source and source elements as previously described, which optionally locks (and minimizes, preferably) the addition source UI(s), and copies (602) the selected information elements of the additional source(s) into the transfer buffer (preferably maintaining logical association of information elements) such that they are also displayed in the IV UI.

After all sources have been combined into the IV UI, the user then designates (610) a plurality of insertion points or areas in one or more destination documents, files, folders, user interfaces, etc. Next, the user defines sets of these designated destination points and areas which logically belong together for receipt of information elements. According to the preferred embodiment, the user may define a single destination into more than one sets of destination such that information may be transferred to each destination according to one or more groups of destinations. For example, Table 1 provides an example of such a definition of three destinations including a web page being created with Netscape Composer™, a document being edited with Lotus WordPro™, and IBM's VisualAge™ software source code editor.

TABLE 1

Example Destination Group Designations by Destination

| Destination Unit | Area or Point | Destination Set |
|---|---|---|
| index.htm | Table 1, Row 1, cell 3 | A |
| document.lwp | page 3, line 9 | A |
| document.lwp | page 8, pinned to TOP | B, C |
| dosomething.c | page 5, line 1 | C |
| dosomething.c | page 102, line 22 | B, D |

In this example, point or area in a table #1 at row 1, cell 3, in a web page under development called "index.htm" has been designated as a destination as part of destination set A. Similarly, two points in a Lotus WordPro™ file named "document.lwp" have been designated as destinations, with the first point (page 8, pinned to the Top of Page" included in destination set A, and the second point (page 5, line 1) included in destination sets B and C. Likewise, the "C" programming source code file called "dosomething.c" has two destination points in it, a first one at page 5 line 1 in destination set C, and a second point at page 102 line 22 including in destination sets B and D.

Known user interface dialog techniques such as drop down lists, buttons, and text input boxes are preferably used to allow the user to create a new set of destinations and associate each destination with a set.

Next, the user may then go to the IV UI, and manipulate (603) the information elements in groups by logical association, or individually. This manipulation may include rearranging the order in which they appear (originally, they are stored in the order they were designated as a source), deleting them, copying them, and changing them.

When the manipulated source information elements are in an acceptable form to the user, the user may elect select one or more of the manipulated information elements (612) such as by highlighting or right-clicking them in the IV UI, and then may select one or more destination sets to which the selected manipulated information elements are to be transferred (e.g. pasted). Again, typical GUI controls such as drop-down lists, radio buttons, text input boxes, and the like can be employed to produce a menu or pop-up dialog which, upon user invocation such as double right-clicking, provides the user with options for selecting the defined destination sets for receiving the selected information elements.

When the user finalizes his or her choices as to the sets of destinations, the selected information elements are transferred (613) to the destinations as defined by a the set definitions. A reverse lookup process can be employed to determine which individual destinations to receive the selected information elements, such as by re-ordering the information shown in Table 1 to appear in a form such as that shown in Table 2.

TABLE 2

Example Destination Group Designations Reordered

| Destination Set | Destination Unit(Area or Point) |
|---|---|
| A | index.htm/(Table 1, Row 1, cell 3); |
| B | document.lwp(p8, TOP), dosomething.c (p102, 122); |
| C | document.lwp(p8, TOP), dosomething.c(p5, 11); |
| D | dosomething.c (p102, 122) |

In this reordering of the definitions of destination sets, it is straightforward for the logical process of the invention to determine which destination should receive selected information elements based upon the user's set selection. For example, if the user selects several information elements, and then indicates to transfer those elements to destination set B, the system can determine that the elements should be transferred to the top of page 8 in document.lwp, as well as to line 22 of page 102 in the source code file dosomething.c.

The logical process allows the user to continue (614) transferring (612, 613) and/or manipulating (603) the collected information elements via the IV UI until he or she has completed the desired transfers, at which time the logical process of the invention is completed (604). If the source UI's were locked and/or minimized, they are unlocked (606) at this point, and preferably are restored to their original prominence on the user's computer display. Optionally, the system may be configured to leave the source UI's minimized, or to automatically close them.

Action Logs and Undo Functions

As the sources are designated, the invention preferably keeps track of these sources by an action log, such as the one shown in Table 3, which uses the previous example provided in the Background of the Invention for illustration. Here, according to our preferred embodiment, we record the action log in a markup-style language such as XML, but this can be accomplished using a number of other formats (e.g. binary, text, etc.).

TABLE 3

Example Action Log

```
<Intermediate_Viewer_action_log>
    <element_group>
        <element_group_source> "miles.xls"</element_group_source>
        <table_element>
            <row>"Name ^ Tab Age ^ Tab Miles Driven </row>
            <row> Bob ^ Tab 23 ^ Tab 1023 </row>
            <row> Jane ^ Tab 44 ^ Tab 925 </row>
            <row> Hal ^ Tab 58 ^ Tab 2041 </row>
        </table_element>
    </element_group>
    <element_group>
        <element_group_source> "Map_image.jpg"</element_group_source>
        <graphic_element> Map_image </graphic_element>
    </element_group>
    <element_group>
        <element_group_source> http://www.anypage.com
            </element_group_source>
        <text_element> "Our three drivers celebrate the conclusion of their
            trip to see all of the sites where Elvis Presley ate peanut butter
            sandwiches in public."
        </text_element>
        <graphic_element> Group_Photo </graphic_element>
    </element_group>
</Intermediate_Viewer_action_log>
```

Figure 7:
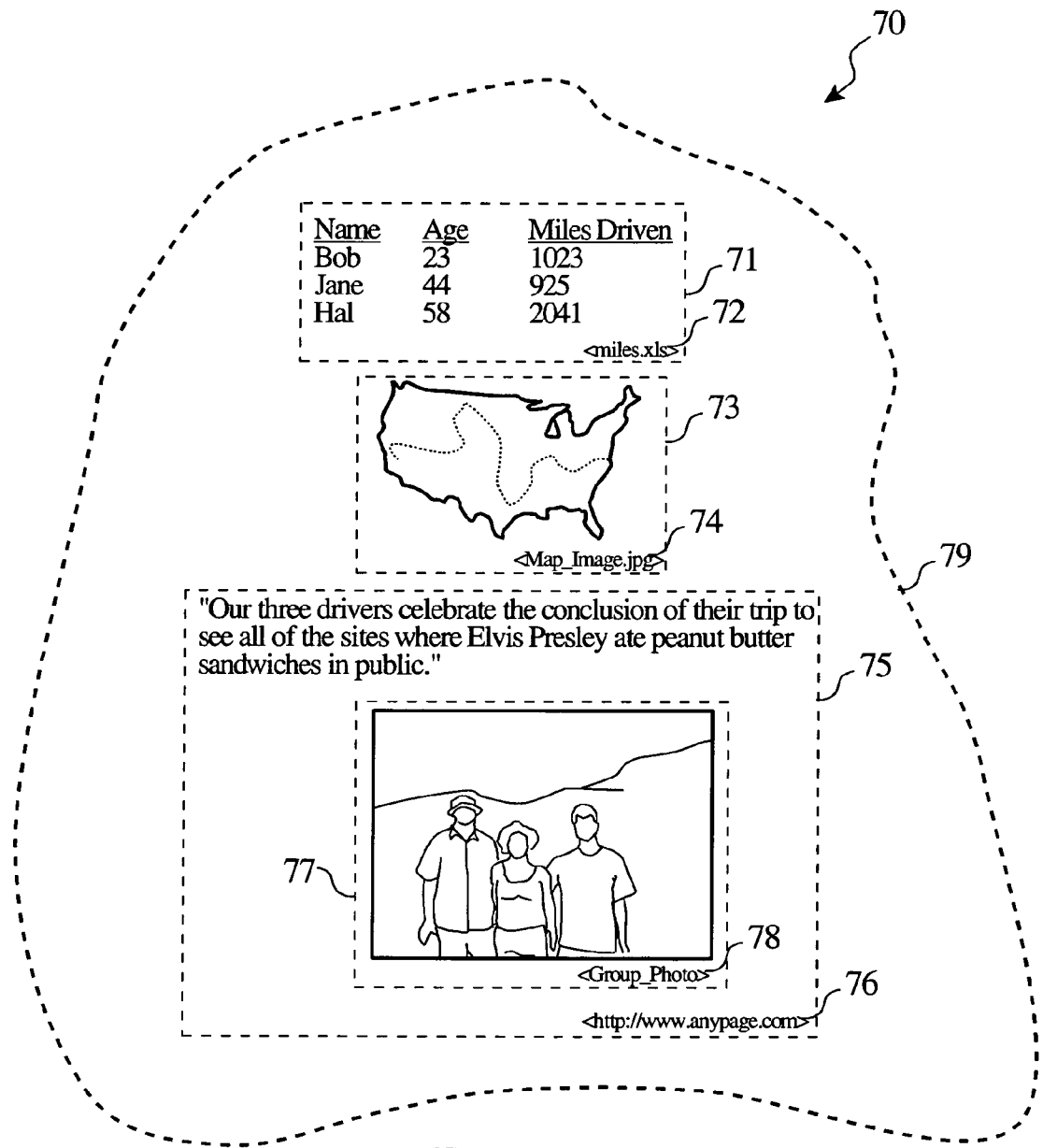
FIG. 7 shows an example graphical display of consolidated information in the Intermediate Viewer.

In this action log, which is built during the steps of designating each source, the order of designation is preserved, which represents the order that the information elements will be displayed, preferably along with indicators of logical groups according to the sources from where they were copied. FIG. 7 shows such an example display of these elements.

The initial arrangement (70) of information elements are shown on a portion (79) of a computer display in the Meta Window GUI, in the order in which they were originally designated as sources, e.g. spreadsheet table (71) first, map image (73) second, text and image (75) from web page third, as in our example.

Figure 8:
FIG. 8 shows a "clean" display option of consolidated information in the Meta Intermediate Viewer.
Figure 8:
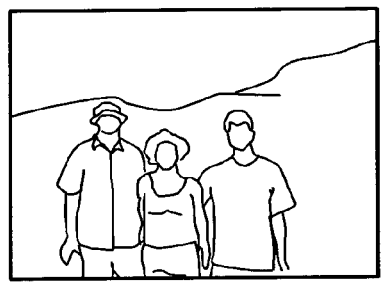

Additionally, the logical grouping of elements are indicated to the user, such as by the display of dotted lines or shaded backgrounds, colors of text, etc., including an indicator of the source of the information elements (72, 74, 76, 78). According to the preferred embodiment, these group indicators can be suppressed (e.g. turned off), as well as the source indicators can be suppressed, to yield a layout (80) such as that shown in FIG. 8 (e.g. a clean layout view).

Figure 9:
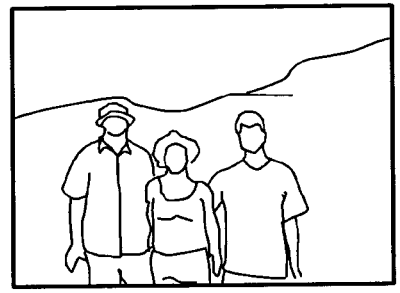
FIG. 9 illustrates a rearranged set of information elements as seen in the Intermediate Viewer.
Figure 9:

The user can manipulate the information elements, such as changing their order of appearance, using traditional methods within the Meta Window GUI. For example, the user may move the map image to appear last on the page, as the arrangement (90) of information elements shown in FIG. 9. This would result in a change to the action log recording this movement, such as the example given in Table 4.

TABLE 4

Example Re-arranged Action Log

```
<Intermediate_Viewer_action_log>
    <element_group>
        <element_group_source> "miles.xls"</element_group_source>
        <table_element>
            <row>"Name ^ Tab Age ^ Tab Miles Driven </row>
            <row> Bob ^ Tab 23 ^ Tab 1023 </row>
            <row> Jane ^ Tab 44 ^ Tab 925 </row>
```

TABLE 4-continued

Example Re-arranged Action Log

```
    <row> Hal ^Tab 58 ^Tab 2041 </row>
    </table_element>
 </element_group>
 <element_group>
    <element_group_source> http://www.anypage.com
        </element_group_source>
    <text_element> "Our three drivers celebrate the conclusion of their
        trip to see all of the sites where Elvis Presley ate peanut butter
        sandwiches in public."
    </text_element>
    <graphic_element> Group_Photo </graphic_element>
 </element_group>
 <element_group>
    <element_group_source> "Map_image.jpg"</element_group_
        source>
    <graphic_element> Map_image </graphic_element>
 </element_group>
</Intermediate_Viewer_action_log>
```

Further according to the preferred embodiment, a Do-Undo list is maintained by the IV, such that the user can reverse the effect of any operation the user performs. For example, if the user moves an element from its initial position, the Do-Undo list records the movement, including the initial position. If the user selects "Undo-Move", the element will be automatically restored to its original position. Table 5 shows an example of such a list using the previously described scenario.

TABLE 5

Example Do-Undo List

```
<Intermediate_Viewer_Do-Undo>
    <add> miles.xls </add>
    <add> Map_Image.jpg </add>
    <add> http://www.anypage.com </add>
    <group_operation>
        <delete> Map_Image.jpg </delete>
        <add> Map_Image.jpg </add>
    </group_operation>
</Intermediate_Viewer_Do-Undo>
```

In this example, the "move" of the map image is accomplished by a two-step operation of deleting the existing occurrence, and then adding it to the end of the list. If the user selects "undo-move" for this map image, the Do-Undo list may be modified in a way as shown in Table 6.

TABLE 6

Example Modified Do-Undo List

```
<Intermediate_Viewer_Do-Undo>
    <add> miles.xls </add>
    <add> Map_Image.jpg </add>
    <add> http://www.anypage.com </add>
    <group_operation>
        <delete> Map_Image.jpg </delete>
        <add> Map_Image.jpg </add>
    </group_operation>
    <group_operation>
        <delete> *ALL* </delete>
        <add> miles.xls </add>
        <add> Map_Image.jpg </add>
        <add> http://www.anypage.com </add>
    </group_operation>
</Intermediate_Viewer_Do-Undo>
```

In Table 6, one method of restoring or undoing the action is shown in which all the elements are deleted and then are restored to their original order. In alternate embodiments, the list may include element sequence numbers or indicators, and the moved element may be restored to its original sequence number. Other known methods of maintaining reversible lists of action may be employed, as well.

Enhanced Consolidation Operation

According to another aspect of the present invention, the user interface for the IV UI is enhanced to allow "drag and drop" consolidation of source documents into the IV UI by selecting an icon or file listing representing a source file with a mouse or pointing device (e.g. stylus, trackball, etc.), dragging the selected item onto an icon or listing for the Meta Window, and dropping them.

Figure 10:
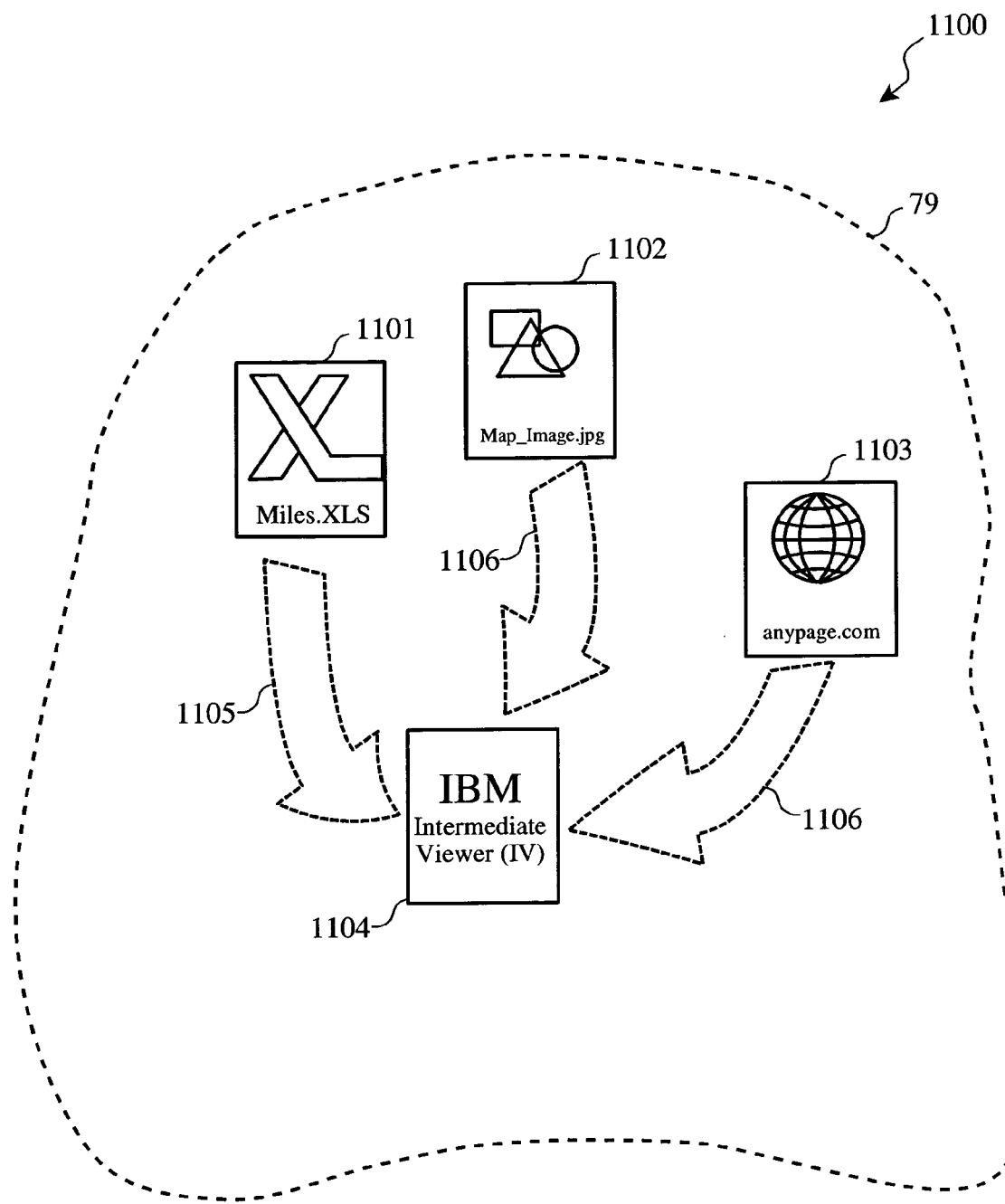
FIG. 10 depicts the drag-and-drop operation for consolidating information into the Intermediate Viewer according to an enhanced embodiment of the present invention.

FIG. 10 illustrates such a convenient operation (1100), wherein the icon (1101) for the source MS Excel™ file is first dragged and dropped (1105) onto the IV icon (1104). Next, the icon (1102) for the image file is dragged and dropped (1106) on the IV icon (1104). Finally, an icon for the source web page (1103) is dragged and dropped onto the IV icon (1104).

Through use of this enhanced embodiment of the present invention, all switching between application program GUI's is minimized or even eliminated, allowing the user to quickly consolidate the information into the Meta Window, where the user can go straight away to manipulating the information elements as needed.

In an alternate embodiment, a text-style listing of source files and the IV program can be dragged and dropped, as well, such as dragging and dropping text listings in the MS Windows Explorer environment (when the View-Details option is selected).

Illustration of Multiple Destination Sets

Figure 11:
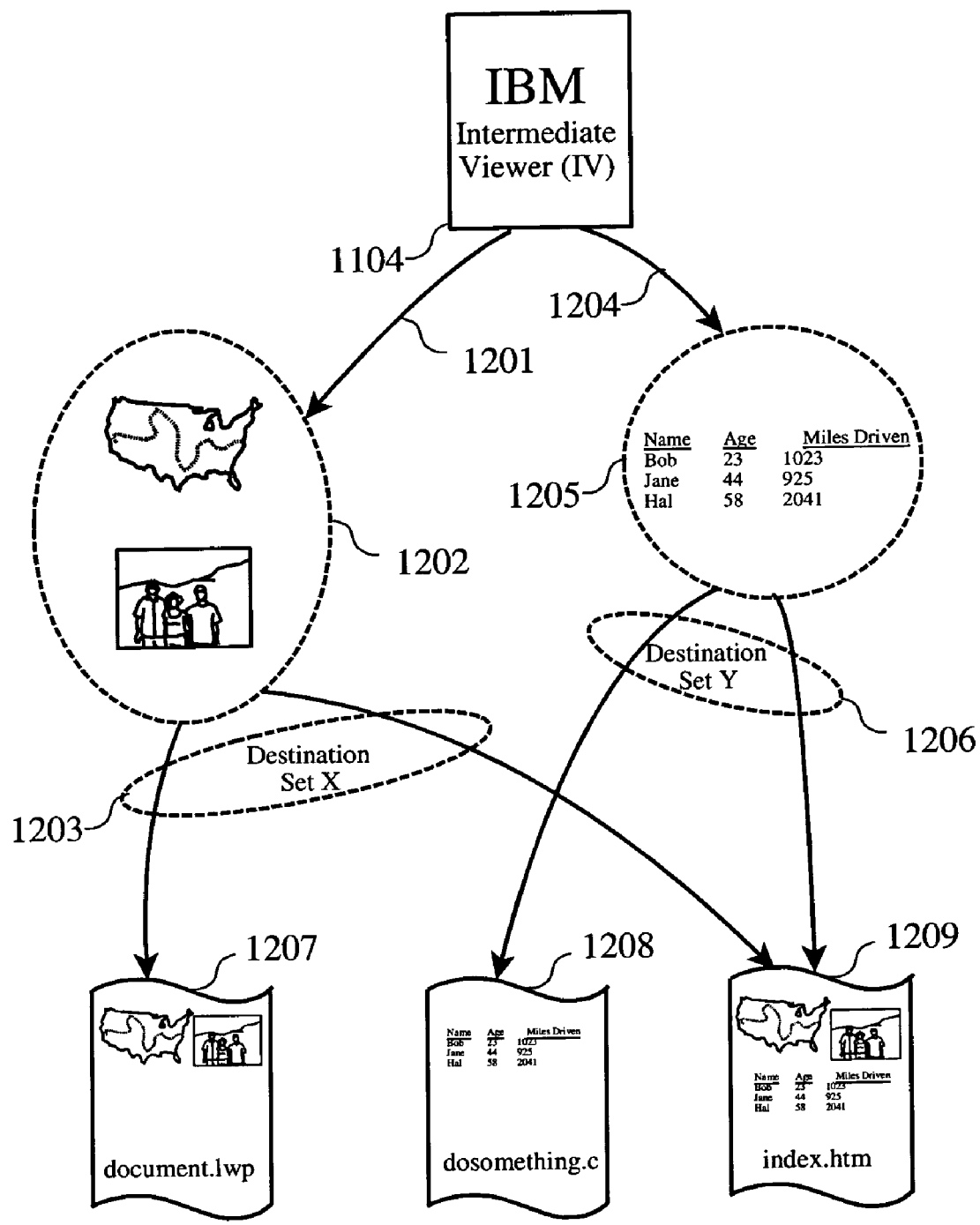
FIG. 11 illustrates an example of transferring selected content from the Intermediate Viewer to multiple destinations as defined by sets of destinations.

Turning now to FIG. 11, we revisit our example of three information elements which were copied into the IV from multiple sources—a graphic map image, a photograph, and a table of information. Once in the IV, they can be rearranged and manipulated as previously described. In the example shown in FIG. 11, two destination sets X and Y have been defined by the user. Destination Set X is defined as a point or area within the word processor document.lwp file (1207) and the index.htm web page file (1209). Destination Set Y is defined as points or areas within the dosomething.c software source code file (1208) (e.g. such as a comments area), and in the index.htm web page file (1209).

As can be seen from this illustration, the IV (1104) is used to select (1201) the map and photo elements (1202) and transfer (1203) them to the files (1207, 1209) belonging to Destination Set X. Likewise, the IV (1204) is used to select (1204) the table element (1205), and to transfer it to the files (1208, 1209) belonging to the Destination Set Y (1206).

Enhanced Embodiment with Spell/Grammar Checker

Figure 12:
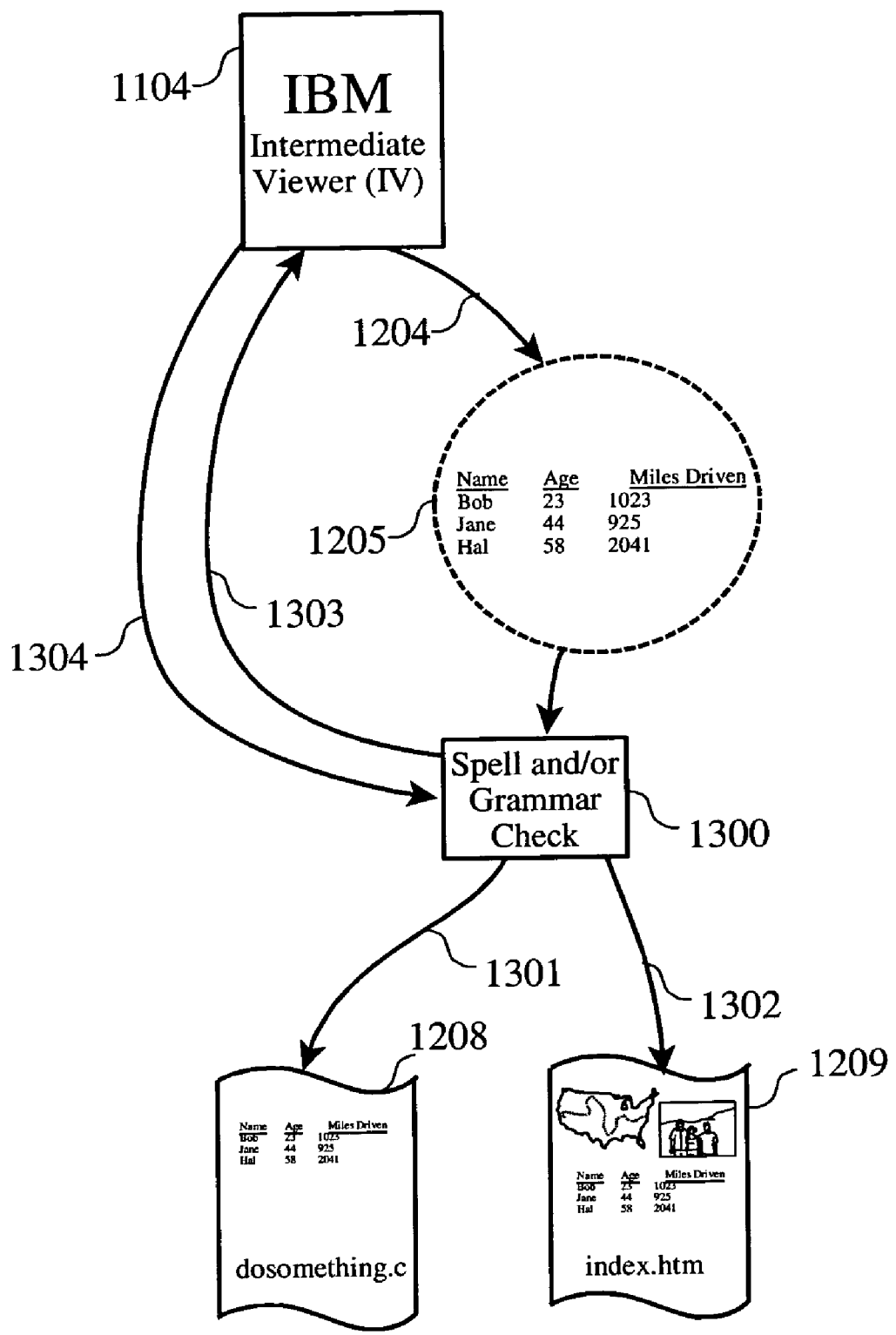
FIG. 12 shows an aspect of an enhanced embodiment of the present invention in which a spell check, grammar checker, or both are invoked to check transferred text before it is delivered to one or more destinations.

Turning now to FIG. 12, an aspect of an enhanced realization of the present invention is disclosed in which a spell checker, grammar checker, or both (1300) is invoked when selected text elements (1205) are designated for transfer (1301, 1302) to one or more destinations (1208, 1209). In this optional embodiment feature, the user may configure the Intermediate Viewer (1104) to spell check and/or grammar check transferred text before delivering it to destination application programs, documents, etc., in order to prevent transferring of errors from the source to the destination(s).

A conventional spell checker and/or grammar checker can be employed for this function, the source code for which is readily available from suppliers such as the WGrammar grammar checker engine and the Sentry Spelling Checker engine, both from Wintertree Software.

If a spell and/or grammar check detects problems which require user intervention to correct, the text with the error may be transferred (1303) back to the user interface for the Intermediate Viewer for user correction, modification, or acceptance as is. Then, the revised text may be returned (1304) to the checker (1300) for delivery (1301, 1302) into the selected destinations (1208, 1209).

Conclusion

The present invention may be realized in a variety of forms, programming languages, methodologies, and operating systems on a variety of computing platforms without departure from the spirit and scope of the present invention. A number of example embodiment details have been disclosed as well as optional aspects of the present invention in order to illustrate the invention, but which do not define the scope of the invention. Therefore, the scope of the present invention should be determined by the following claims.

What is claimed is:

1. A method comprising the steps of:

while editing by a user contents of at least one computer resource in at least one graphical user interface, allowing said user to designate a plurality of sets of copy command destinations points within said displayed contents within said graphical user interface, wherein each copy command destination point is allowed to be included in more than one set of copy command destination points, said computer resource comprising one or more computer files being edited by said user, and said copy command destination points comprising positions within said computer resource contents;

providing an Intermediate Viewer configured:
  a. to display one or more information elements contained in an operating system clipboard transfer buffer,
  b. to receive a selection by said user of one or more displayed information elements in said clipboard transfer buffer, and
  c. to define a subset of said previously-designated copy command destination points; and automatically transferring from said clipboard transfer buffer a plurality of copies of said selected information elements to points within the contents of said computer resource corresponding to each of said copy command destination points in said subset of copy command destination points.

2. The method as set forth in claim 1 further comprising the step of allowing via said Intermediate Viewer manipulation of said information elements.

3. The method as set forth in claim 1 further comprising the step of receiving a plurality information elements into said Intermediate Viewer from one or more source computer resources via a transfer buffer.

4. The method as set forth in claim 1 further comprising providing a do list and an undo function for reversing actions recorded within said do list.

5. The method as set forth in claim 1 wherein said step of transferring copies of information elements from said transfer buffer to each of said copy command destination points comprises performing an action on text information elements selected from the group of spell checking, grammar checking, and spell/grammar checking, prior to delivery to each of said copy command destination points.

* * * * *